US011376827B2

(12) United States Patent
Harada

(10) Patent No.: US 11,376,827 B2
(45) Date of Patent: Jul. 5, 2022

(54) SILICONE-COATED FABRIC

(71) Applicant: TOYOBO CO., LTD., Osaka (JP)

(72) Inventor: Hirotaka Harada, Shiga (JP)

(73) Assignee: TOYOBO CO., LTD., Osaka (JP)

(*) Notice: Subject to any disclaimer, the term of this patent is extended or adjusted under 35 U.S.C. 154(b) by 0 days.

(21) Appl. No.: 16/343,087

(22) PCT Filed: Oct. 20, 2017

(86) PCT No.: PCT/JP2017/037944
§ 371 (c)(1),
(2) Date: Apr. 18, 2019

(87) PCT Pub. No.: WO2018/074573
PCT Pub. Date: Apr. 26, 2018

(65) Prior Publication Data
US 2019/0275772 A1 Sep. 12, 2019

(30) Foreign Application Priority Data
Oct. 21, 2016 (JP) .................. 2016-206635

(51) Int. Cl.
B32B 27/28 (2006.01)
B60R 21/235 (2006.01)
(Continued)

(52) U.S. Cl.
CPC ............ B32B 27/283 (2013.01); B32B 27/00 (2013.01); B32B 27/12 (2013.01); B60R 21/235 (2013.01);
(Continued)

(58) Field of Classification Search
CPC ................ B32B 27/283; B60R 21/235; D10B 2505/124; D06M 15/643
See application file for complete search history.

(56) References Cited

U.S. PATENT DOCUMENTS 5,104,727 A * 4/1992 Wnenchak ......... B01D 39/1692
280/743.1
5,110,666 A * 5/1992 Menzel ................. B60R 21/235
280/728.1

(Continued)

FOREIGN PATENT DOCUMENTS

CN 1985037 6/2007
CN 101535429 9/2009
(Continued)

OTHER PUBLICATIONS https://patents.google.com/patent/US20180274167A1/en?oq=20180274167 (Year: 2015).*
(Continued)

Primary Examiner — Arti Singh-Pandey
(74) Attorney, Agent, or Firm — Fish & Richardson P.C.

(57) ABSTRACT

This invention provides a silicone-coated fabric for airbags in which creases can be easily formed by applying heat and pressure, and that can be stored compactly. More specifically, the invention provides a silicone-coated fabric comprising a silicone-based resin coated on one surface of a synthetic fiber woven fabric, and a thermoplastic resin adhering to a non-silicone coated surface, which is not coated with the silicone-based resin, wherein the adhesive strength between the non-silicone coated surfaces is 0.01 to 100 N/cm.

14 Claims, 3 Drawing Sheets

(51) Int. Cl.
  D06M 15/643 (2006.01)
  B32B 27/12 (2006.01)
  D06M 15/19 (2006.01)
  B32B 27/00 (2006.01)

(52) U.S. Cl.
  CPC .......... D06M 15/19 (2013.01); D06M 15/643 (2013.01); *D10B 2505/124* (2013.01)

(56) References Cited

U.S. PATENT DOCUMENTS

| | | | | |
|---|---|---|---|---|
| 5,254,621 | A * | 10/1993 | Inoue | B60R 21/235 280/728.1 |
| 6,698,458 | B1 * | 3/2004 | Sollars, Jr. | B32B 27/02 139/387 R |
| 6,701,971 | B1 * | 3/2004 | Sollars, Jr. | B32B 27/12 139/387 R |
| 2002/0022420 | A1 | 2/2002 | Veiga et al. | |
| 2002/0033589 | A1 * | 3/2002 | Barnes | B32B 27/12 280/728.1 |
| 2002/0122908 | A1 * | 9/2002 | Li | B32B 5/026 428/36.2 |
| 2003/0040238 | A1 | 2/2003 | Li | |
| 2007/0128963 | A1 * | 6/2007 | Vogt | B32B 7/12 442/301 |
| 2007/0256595 | A1 | 11/2007 | Nozoe | |
| 2008/0042414 | A1 | 2/2008 | Nagaoka | |
| 2008/0085942 | A1 | 4/2008 | Jackson et al. | |
| 2009/0197027 | A1 * | 8/2009 | Li | B60R 21/235 428/36.1 |
| 2010/0181744 | A1 * | 7/2010 | Crouch | B60R 21/235 280/728.1 |
| 2014/0220245 | A1 | 8/2014 | Nagaoka | |
| 2015/0115574 | A1 | 4/2015 | Enoki et al. | |
| 2015/0247283 | A1 | 9/2015 | Akechi | |
| 2016/0244019 | A1 * | 8/2016 | Beasley, Jr. | B60R 21/232 |
| 2018/0093634 | A1 | 4/2018 | Hosaka et al. | |
| 2018/0274167 | A1 * | 9/2018 | Kodera | D03D 13/008 |

FOREIGN PATENT DOCUMENTS

| | | |
|---|---|---|
| CN | 104160086 | 11/2014 |
| CN | 104619908 | 5/2015 |
| JP | H10-291453 | 11/1998 |
| JP | 2006-077145 | 3/2006 |
| JP | 2006-082443 | 3/2006 |
| JP | 2015-104998 | 6/2015 |
| WO | 2013/133382 | 9/2013 |
| WO | WO 2016/158858 | 10/2015 |

OTHER PUBLICATIONS

Japan Patent Office, International Search Report for PCT/JP2017/037944 dated Dec. 5, 2018 with English translation.
Japan Patent Office, International Search Report for PCT/JP2017/037944 dated Dec. 5, 2017 with English translation.
EP Extended European Search Report in European Appln. No. 17862131.4, dated Jun. 9, 2020, 6 pages.
Office Action in Chinese Appln. No. CN 201780064533.8, dated Mar. 30, 2021, 13 pages, with English Translation.
Office Action in Korean Appln. No. KR 10-2019-7014039, dated Nov. 24, 2021, 8 pages, with English Translation.

* cited by examiner

SILICONE-COATED FABRIC

TECHNICAL FIELD

The present invention relates to a silicone-coated fabric comprising a thermoplastic resin adhering to its non-silicone-coated surface, and to an airbag obtained using the fabric.

BACKGROUND ART

During regular driving, airbags are stored in the steering wheel, dashboard, etc., and in a vehicle collision, a sensor detects the impact and generates high-pressure gas, with which the airbag is inflated instantaneously. The inflated airbag prevents occupants from hitting the steering wheel etc.

Therefore, the fabrics used for airbags are required to, first, have high air tightness to minimize gas leakage, second, have appropriate strength, and third, be able to be folded compactly so as to be stored in a small limited space in a vehicle as described above. A fourth requirement is that the fabrics be highly responsive and light so that the bag is inflated quickly when necessary.

Under such circumstances, coated fabrics conventionally used for airbags are fabrics in which an elastomer, such as synthetic rubber (e.g., chloroprene, chlorosulfonated olefin, and silicone), is stacked onto one surface of a plain-weave fabric formed of nylon 66 filament yarn (dtex: 400 to 1100).

Patent Literature (PTL) 1 discloses a fabric for airbags in which a silicone rubber composition obtained by incorporating a thermoplastic resin powder into silicone rubber is coated onto a nylon 66 woven fabric. In PTL 1, the thermoplastic resin powder is used by mixing with silicone rubber so that the thermoplastic resin powder is present in the silicone rubber in a buried state. Further, in PTL 1, the thermoplastic resin powder is incorporated for the purpose of reducing the surface adhesiveness of the silicone rubber and improving the texture.

CITATION LIST

Patent Literature

PTL 1: JP2006-77145A

SUMMARY OF INVENTION

Technical Problem

To fold a fabric for airbags compactly, a recently used storage method comprises simultaneously applying heat and pressure to a base fabric to form creases to fold the fabric more compactly. The storage method comprising simultaneously applying heat and pressure to form creases is only used for non-coated fabrics as a base fabric, rather than for silicone-coated fabrics, which are currently used mainly as a base fabric for airbags. This is because silicone-based resins used in silicone-coated fabrics are a thermosetting resin, and a silicone-coated layer that has already been cured on a base fabric does not easily form creases by heating; thus, even when a process of forming creases was performed by applying heat and pressure, it was impossible to fold the fabric compactly.

An object of the present invention is to provide a silicone-coated fabric for airbags in which creases can easily be formed by applying heat and pressure, and that can be stored compactly.

Technical Problem

To solve the above problems, the present inventor conducted extensive research. The present invention has thus been completed. More specifically, the present invention is as follows.

1. A silicone-coated fabric comprising
a silicone-based resin coated on one surface of a synthetic fiber woven fabric, and
a thermoplastic resin adhering to a non-silicone coated surface, which is not coated with the silicone-based resin, wherein the adhesive strength between the non-silicone coated surfaces is 0.01 to 100 N/cm.
2. The silicone-coated fabric according to Item 1, wherein the thermoplastic resin has a melting point of 50 to 200° C.
3. The silicone-coated fabric according to Item 1 or 2, wherein the coating amount of the silicone-based resin is 10 to 200 g/m$^2$.
4. An airbag obtained by using the silicone-coated fabric of any one of Items 1 to 3.

Advantageous Effects of Invention

In an airbag formed of the silicone-coated fabric of the present invention, creases can be easily formed by applying heat and pressure, which enables the airbag to be stored compactly. This airbag has high airtightness as with airbags formed of a conventional silicone-coated fabric. Furthermore, the use of this silicone-coated fabric enables production of an airbag that can be stored compactly, which is advantageous since restrictions on vehicle interior designs can be reduced.

DESCRIPTION OF EMBODIMENTS

Figure 1:
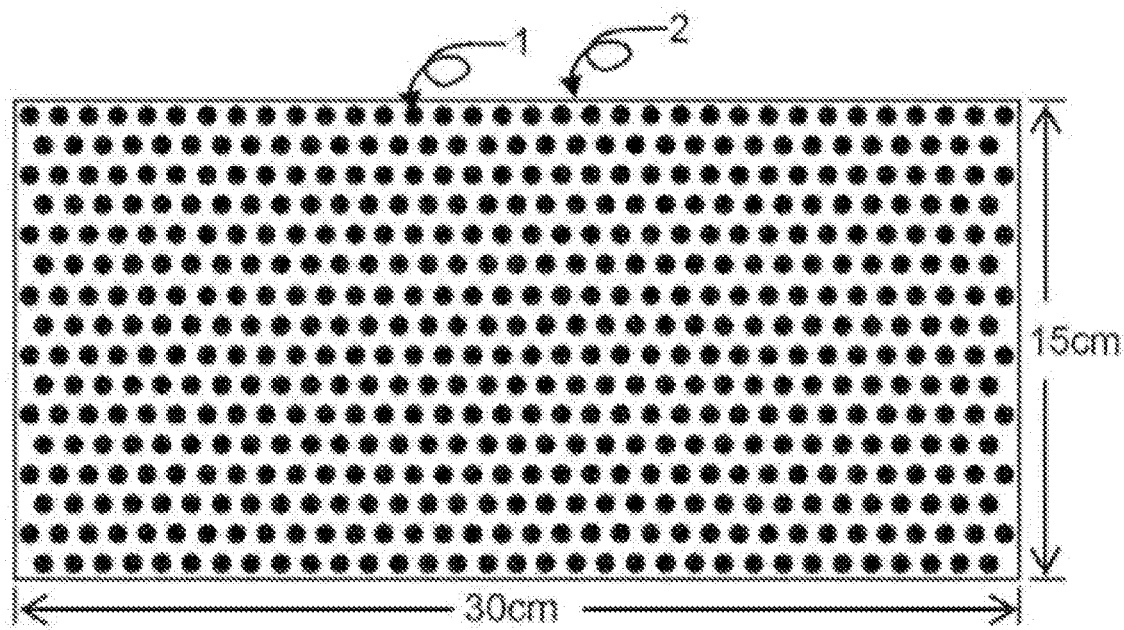
FIG. 1 is a drawing regarding the arrangement of the thermoplastic resin of Examples 1 and 3 to 5.
Figure 2:
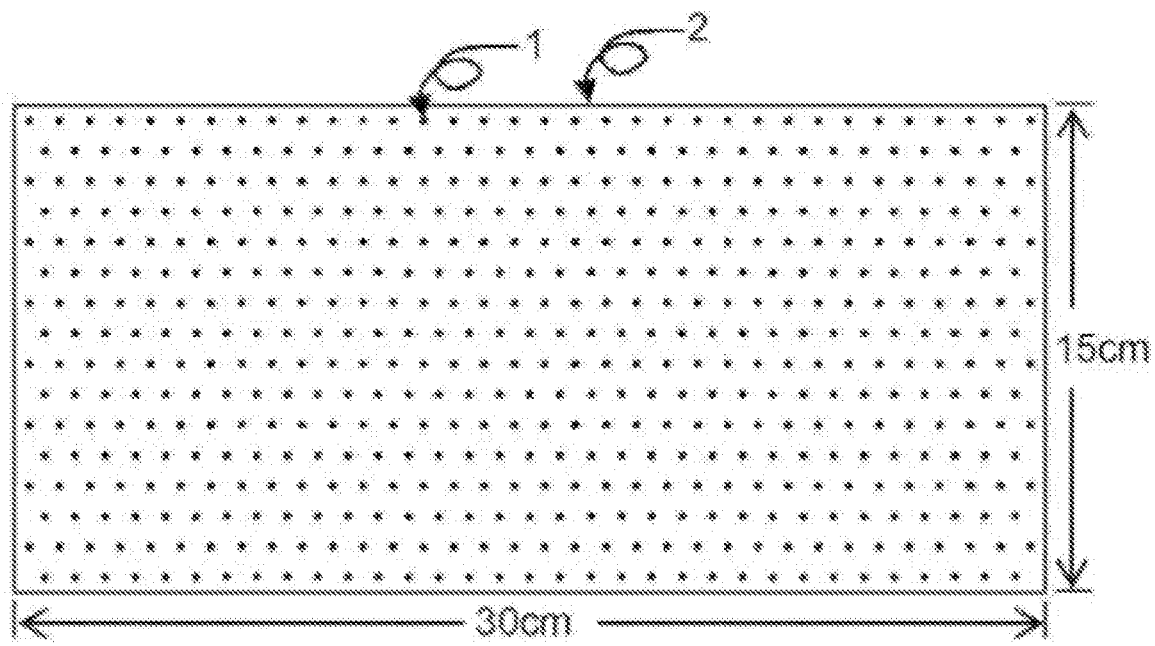
FIG. 2 is a drawing regarding the arrangement of the thermoplastic resin of Example 2.
Figure 3:
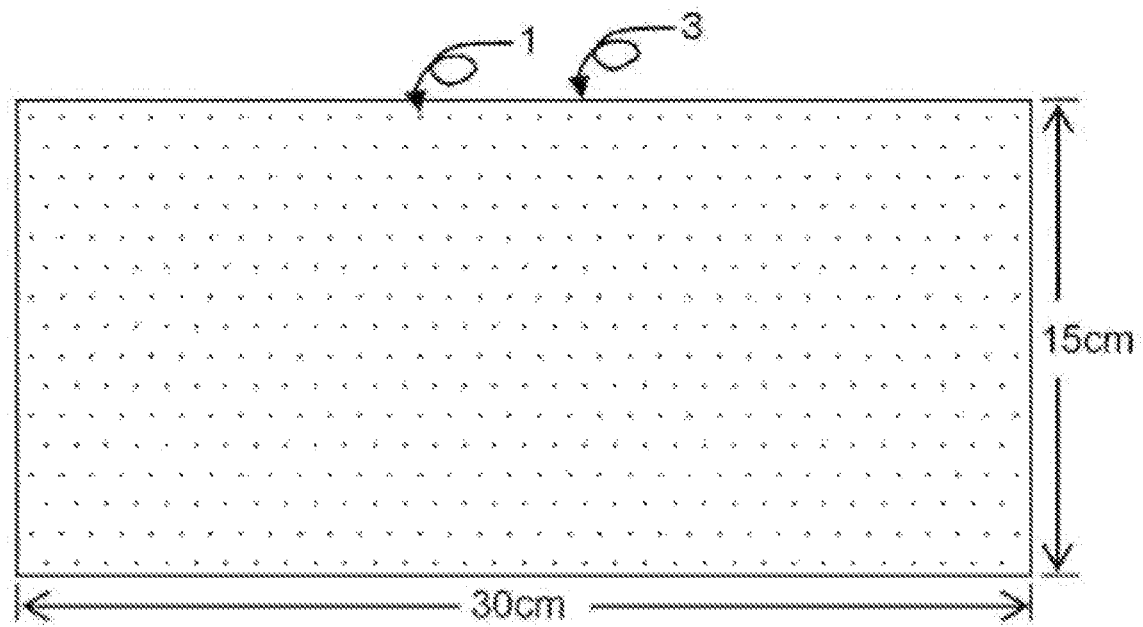
FIG. 3 is a drawing regarding the arrangement of the thermoplastic resin of Comparative Example 2.

The following describes the present invention in detail.

In the present invention, the term "synthetic fiber woven fabric" refers to a woven fabric woven from a synthetic fiber yarn. The woven fabric is excellent in mechanical strength and also excellent in reducible thickness. The structure of the woven fabric may be, but is not limited to, a plain weave, a twill weave, a sateen weave, a variation of these weaving patterns, a multiaxial woven pattern, or the like; of these, a plain-weave fabric, which is excellent in mechanical strength, is particularly preferable.

Usable synthetic fiber yarn may be formed of, in particular, aliphatic polyamide fibers, such as nylon 66, nylon 6, nylon 46, and nylon 12; aromatic polyamide fibers, such as aramid fibers; and polyester fibers, such as polyethylene terephthalate, polymethylene terephthalate, and polybutylene terephthalate.

Additionally, synthetic fiber yarn may be formed of wholly aromatic polyester fibers, poly(p-phenylene benzobisoxazole) fibers (PBO fibers), ultrahigh-molecular-weight polyethylene fibers, polyphenylene sulfide fibers, polyether ketone fibers, and the like. From an economical viewpoint, polyester fiber yarn and polyamide fiber yarn are preferable, and polyamide 66 fiber yarn is particularly preferable. These fibers may be obtained from a starting material, part or all of which is a recycled material.

These synthetic fibers for synthetic fiber yarn may contain various additives in order to make it easier to perform the yarn production and subsequent weaving process. Examples of additives include antioxidants, heat stabilizers, smoothing agents, antistatic agents, thickening agents, flame retardants, and the like. These synthetic fibers may be solution-dyed yarn or yarn dyed after spinning. The cross-sectional surface of a single type of yarn may be a usual round cross-section or irregular cross-section typified by, for example, a triangular cross-section. For the synthetic fiber yarn, it is preferable to use a multifilament yarn containing 72 filaments or more, from the standpoint of flexibility and smoothness of the silicone-coated surface. Although the upper limit is not particularly limited, the number of filaments is preferably 216 or less, since an overly large number of filaments makes the production of the yarn difficult. The fineness is preferably 0.1 to 10 dpf per single yarn of the obtained yarn.

The synthetic fiber woven fabric of the present invention preferably has an oil amount of 0.20 wt % or less. When the oil amount exceeds 0.20 wt %, the adhesiveness with a silicone-based resin decreases. The oil amount is more preferably 0.15 wt % or less, and more preferably 0.10 wt % or less. Although the lower limit is not particularly limited, the oil amount is preferably 0.005 wt % or more, and more preferably 0.01 wt % or more.

Specific examples of silicone-based resins include addition polymerization silicone rubber, such as dimethyl silicone rubber, methyl vinyl silicone rubber, methylphenyl silicone rubber, trimethyl silicone rubber, fluorosilicone rubber, methyl silicone resin, methylphenyl silicone resin, methyl vinyl silicone resin, epoxy-modified silicone resin, acrylic-modified silicone resin, polyester-modified silicone resin, and the like. Of these, addition polymerization methyl vinyl silicone rubber is preferable because the rubber exhibits rubber elasticity after being cured, excellent strength and stretchability, and cost advantages.

When a silicone-based resin is used, a curing promoter may be used. Examples include platinum-based compounds, such as platinum powder, chloroplatinic acid, and tetrachloroplatinic acid; palladium compounds; rhodium compounds; organic peroxides, such as benzoyl peroxide, perchlorobenzoyl peroxide, and orthochloro peroxide; and the like.

To improve the adhesiveness between the silicone-based resin and the synthetic fiber woven fabric, it is preferable to add an adhesive aid to the silicone based-resin. The adhesive aid is, for example, at least one member selected from the group consisting of amino-based silane coupling agents, epoxy-modified silane coupling agents, vinyl-based silane coupling agents, chloro-based silane coupling agents, and mercapto-based silane coupling agents.

In a preferable embodiment, an inorganic filler is also added to the silicone-based resin. The inorganic filler to be added is preferably silica particles, which are the most typical filler and which are used as a filler for reinforcement, viscosity adjustment, heat resistance improvement, flame retardancy improvement, etc. of silicone-based resins. The silica particles preferably have a specific surface area of 50 cm$^2$/g or more, more preferably 50 to 400 cm$^2$/g, and still more preferably 100 to 300 cm$^2$/g. When the specific surface area is within this range, excellent tear strength characteristics can be easily imparted to the obtained silicone-based resin cured product. The specific surface area is measured by a BET method. The silica particles may be used singly or in a combination of two or more. Examples of the silica particles usable in the present invention include natural substances, such as quartz, berg crystal, silica sand, and diatomite; synthetic substances, such as dry silica, silica fume, wet silica, silica gel, and colloidal silica; and the like.

To more easily impart better flowability to the resin composition containing a silicone-based resin and additives, the silica particles are preferably hydrophobic silica particles in which hydrophobization treatment of the particle surface was performed using an organic silicon compound. Examples of the organic silicon compound include methylchlorosilanes, such as trimethylchlorosilane, dimethyldichlorosilane, and methyltrichlorosilane; hexaorganodisilazanes, such as dimethylpolysiloxane, hexamethyldisilazane, divinyltetramethyldisilazane, and dimethyltetravinyldisilazane; and the like.

The silica particle content is preferably 10 to 20 wt %, and more preferably 12 to 20 wt %, based on the entire silicone-based resin. When the silica particle content is less than 10 mass %, the mechanical strength of the silicone-based resin is liable to deteriorate. In contrast, when the silica particle content exceeds 20 wt %, the flowability of the resin composition easily decreases; as a result, the coating workability is deteriorated, the resin becomes brittle, and the adhesiveness tends to deteriorate.

In the present invention, the silicone-based resin to be used preferably has a resin viscosity of 10,000 to 50,000 mPa·sec, more preferably 13,000 to 40,000 mPa·sec, and still more preferably 20,000 to 35,000 mPa·sec. When the resin viscosity is less than 10,000 mPa·sec, the resin penetrates into a woven fabric, making it difficult to ensure the resin thickness necessary for achieving heat resistance and airtightness. In contrast, when the resin viscosity exceeds 50,000 mPa·sec, it is difficult to adjust the coating amount to 50 g/m$^2$ or less. The silicone-based resin may be solvent-based or may be solvent-free as long as its viscosity can be adjusted to be within this viscosity range; a solvent-free silicone resin is preferred in consideration of the impact on the environment.

In the present invention, the coating amount of the silicone-based resin on one surface of the synthetic fiber woven fabric is preferably 10 to 200 g/m$^2$, more preferably 15 to 100 g/m$^2$, and still more preferably 20 to 50 g/m$^2$. When the coating amount of the silicone-based resin is less than 10 g/m$^2$, the coated layer has a low thickness and is easily damaged when the thermoplastic resin adhesion is peeled off. When the coating amount exceeds 200 g/m$^2$, the coated fabric has rigidity too high; therefore, creases cannot be sufficiently formed with the thermoplastic resin adhesion.

Examples of a thermoplastic resin adhering to the non-silicone-coated surface, which is not coated with the silicone-based resin, according to the present invention, include low-density-polyethylene resins, EVA resins, polyamide resins, polyester resins, PVA resins, polyurethane resins, polyolefin resins, ionomer resins, and the like.

The thermoplastic resin preferably has a melting point of 50 to 200° C., more preferably 70 to 150° C., and still more preferably 90 to 120° C. When the melting point of the thermoplastic resin is lower than 50° C., handling is difficult in high-temperature environments. When the melting point exceeds 200° C., the thermoplastic resin must be heated to a high temperature to be melted for folding the airbag, undesirably causing thermal deterioration of the synthetic fiber woven fabric and thus a reduction in the strength of the airbag.

The thermoplastic resin is applied at least to the non-silicone-coated surface, which is not coated with the silicone-based resin, or to both of the surfaces of the silicone-coated fabric. In consideration of the cost and adhesiveness between the thermoplastic resin and the silicone-coated fabric, it is preferable that the resin be applied only to the non-silicone-coated surface.

When being applied to the non-silicone-coated surface of the silicone-coated fabric, the thermoplastic resin may be in any state, such as a solid state, a state of being melted by heat, or a state of being dissolved in a solvent. In particular, a solid state, which does not require energy for melting or a solvent for dissolving, is preferred.

The amount of the thermoplastic resin applied varies depending on the type of the thermoplastic resin and is not particularly limited. The amount is preferably 20 to 400 g/m$^2$, more preferably 25 to 350 g/m$^2$, and still more preferably 30 to 325 g/m$^2$. When the amount of the thermoplastic resin applied is less than 20 g/m$^2$, the creases formed by application of heat and pressure for folding cannot be maintained. When the amount exceeds 400 g/m$^2$, the adhesive strength, described later, becomes too high between the non-silicone-coated surfaces (the surfaces to which the thermoplastic resin is applied) of the silicone-coated fabric; therefore, the filaments constituting the synthetic fiber woven fabric become damaged when the airbag is inflated, which possibly reduces the strength etc., and thus makes it impossible to show sufficient performance as an airbag.

When the resin is in a solid state, examples of the method for applying the thermoplastic resin to the non-silicone-coated surface of the silicone-coated fabric include a method of scattering the resin using vibration etc., a method of spraying the resin using compressed air etc., and a method of pattern processing using dot patterns, gravure rolls, etc. When the resin is in a thermally molten state or a solution state, examples include knife coating, roll coating, T-die coating, and other coating methods; ink-jet spraying and other spraying methods; and the like.

Any pattern of the thermoplastic resin is uniformly placed on the entire non-silicone-coated surface of the silicone-coated fabric. The pattern may be random, dot, slit, or lattice pattern. A random or dot pattern is preferable since they can suppress an increase in the rigidity of the coated fabric, require less energy for applying pressure for folding, and are unlikely to interfere with the folding of the fabric in any direction.

When the thermoplastic resin is applied to the non-silicone-coated surface of the silicone-coated fabric to form any pattern, such as a random, dot, slit, or lattice pattern, the thermoplastic resin adhering area is preferably 1 to 45%, more preferably 3 to 40%, and still more preferably 5 to 35%. When the resin adhering area is less than 1%, creases formed by applying heat and pressure for folding cannot be maintained. When the resin adhering area exceeds 45%, the adhesive strength, described later, becomes too high between the non-silicone-coated surfaces (the surfaces to which the thermoplastic resin is applied) of the silicone-coated fabric. Thus, when the airbag is inflated, the filaments constituting the synthetic fiber woven fabric become damaged, possibly reducing the strength etc. and making it impossible to show sufficient performance as an airbag.

The method of allowing the thermoplastic resin to be adhered and immobilized on the non-silicone-coated surface of the silicone-coated fabric includes an immobilization method comprising using an adhesive beforehand on the coated surface. Alternatively, the resin after being disposed may be heated to melt and cooled to solidification to achieve physical adhesion. When the resin is in a molten state, solidification by cooling is preferable. When the resin is in a solution state, the immobilization method above, a method of performing melting while evaporating the solvent by heating to achieve physical adhesion, or a method of curing the solvent itself by heating or by ultraviolet rays for immobilization may be selected.

The adhesive strength between the non-silicone-coated surfaces (the surfaces to which the thermoplastic resin is applied) of the silicone-coated fabric is 0.01 to 100 N/cm, preferably 0.05 to 80 N/cm, and more preferably 0.1 to 50 N/cm. When the adhesive strength is less than 0.01 N/cm, sufficient adhesive strength cannot be obtained, and creases formed by applying heat and pressure for folding cannot be maintained. When the adhesive strength exceeds 100 N/cm, the filaments constituting the synthetic fiber woven fabric become damaged when the airbag is inflated, which possibly reduces the strength etc., thus making it impossible to show sufficient performance as an airbag.

EXAMPLES

The present invention is described in more detail below with reference to Examples. However, the present invention is not limited to the following Examples. The measurement methods used in the Examples are as follows.

Melting Point of Thermoplastic Resin

A thermoplastic resin (about 5 mg) adhering to the non-silicone-coated surface of a silicone-coated fabric was placed in a sampling pan and melted at a temperature elevation rate of 5° C./min in an atmosphere of air flow at 100 ml/min using a DSC Q100 (produced by TA Instruments); the maximum endothermic peak in the obtained endotherm curve was considered to be the melting point.

Adhesive Strength

When a silicone-coated fabric was used as a sample, two measurement sample sheets of the same size (width: 5 cm; length: 5 cm or more) were cut from a silicone-coated fabric to which a thermoplastic resin adhered. The two cut measurement sample sheets were stacked so that the non-silicone-coated surfaces to which the thermoplastic resin adhered were facing each other. These sheets were sandwiched between metal plates while leaving the regions of 2 cm from each end for the chucks of a tensile tester to hold. A 1 kg weight was placed on the sheets, which were allowed to stand for 30 minutes in an oven at a temperature ±10° C. of the melting point of the thermoplastic resin. After removal from the oven, cooling was performed at 20° C. for 60 minutes while the weight was placed on the sheets, thereby producing a sample for peeling. The produced sample for peeling was peeled at the adhesive portion at a rate of 500 ram/min by RTM-500; the maximum value was read from the obtained chart, and this value was divided by the sample width of 5 cm. The thus-obtained value was considered to be the adhesive strength.

When an airbag was used as a sample, a measurement sample (width: 2 cm or more; length: 2.5 cm or more) was cut from an airbag in a state in which the silicone-coated fabrics to which a thermoplastic resin adhered had been adhesion-treated by applying heat and pressure. In the cut measurement sample, the non-silicone-coated fabrics adhered to each other; thus, a region of 2 cm from one end of the sample was peeled by hand so as to allow the chucks of a tensile tester to hold, and the adhesion portion was peeled at a rate of 500 mm/min by RTM-500; the maximum value was read from the obtained chart, and this value was divided by the sample width. The thus-obtained value was considered to be the adhesive strength.

Compactness

Figure 4:
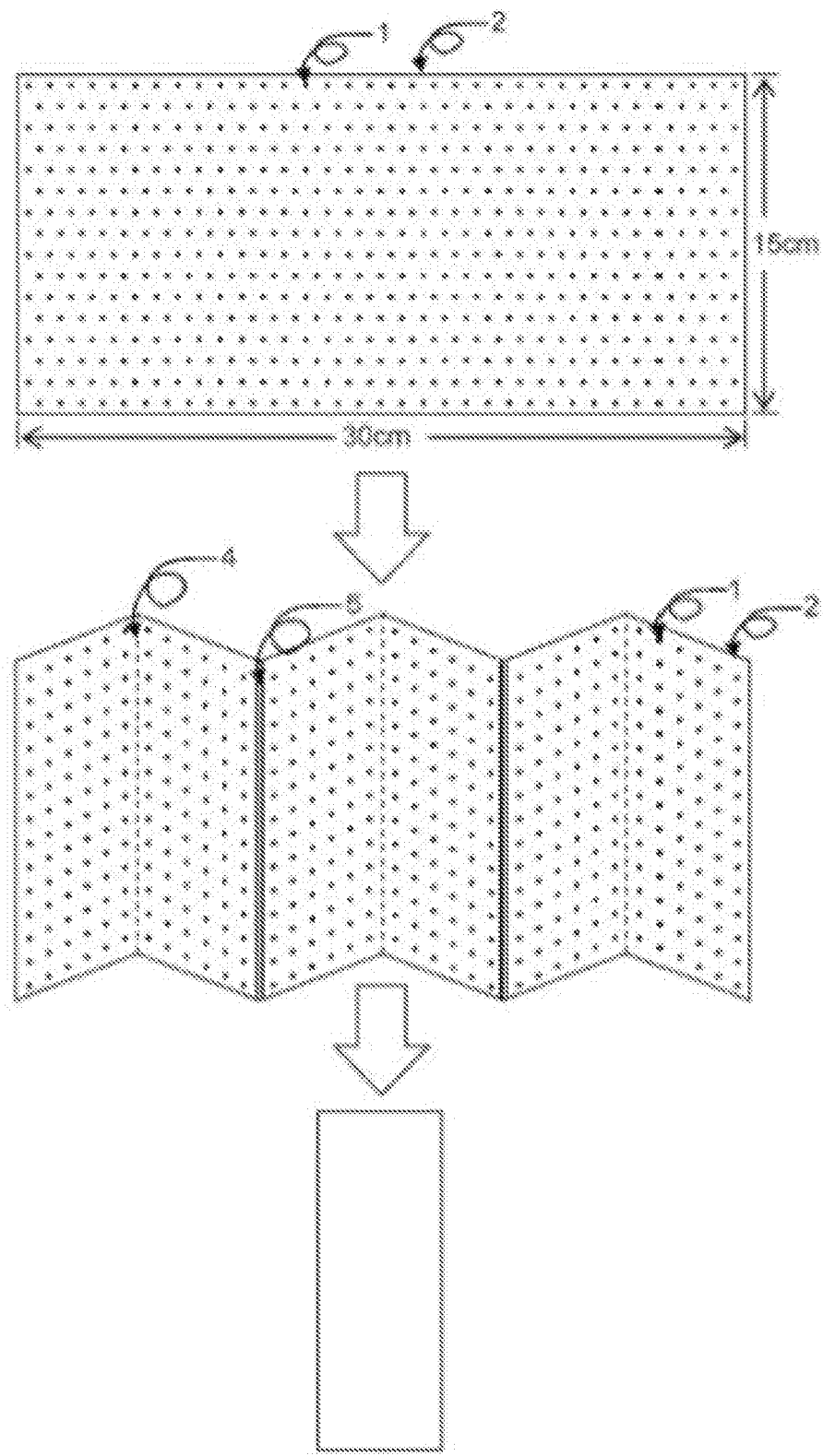
FIG. 4 is a drawing describing the sampling method for evaluation of compactness.

A silicone-coated fabric to which a thermoplastic resin adhered was cut into a size of 15 cm (warp)×30 cm (weft), and folded parallel to the warp 6 times in a bellows form so that portions of the non-silicone-coated surface to which the thermoplastic resin adhered were stacked against each other (see FIG. 4). The thus-obtained sample was packed into a metal container having a diameter of 45 mm, and a 1 kg metal weight having a diameter of 45 mm was placed on the sample, which was allowed to stand for 30 minutes in an oven at 150° C. Thereafter, the resulting product was removed from the oven and cooled at 20° C. for 30 minutes while the weight was placed on it. The sample was removed from the metal container and then allowed to stand at 20° C. for 30 minutes. The widest portion of the sample after being allowed to stand was measured to evaluate the compactness.

For the sample in which a thermoplastic resin adhered to only the silicone-coated surface (Comparative Example 2 below), the evaluation was performed in such a manner that the portions of the silicone-coated surface to which the thermoplastic resin adhered were stacked against each other.

Example 1

A plain-weave fabric was woven from nylon 66 multifilament fiber containing 72 filaments that had a total fineness of 470 dtex by using a water-jet loom. Subsequently, the fabric was subjected to shrinkage processing with boiling water and dry finishing at 110° C. The obtained woven fabric had a weave density in the warp and weft direction of 46 yarns/2.54 cm.

An addition polymerization methyl vinyl silicone resin was applied once to one surface of this woven fabric by knife coating, and curing treatment was performed at 190° C. for 1 minute, thereby obtaining a silicone-coated fabric having a coating amount of 30 g/m$^2$. Thereafter, an LDPE resin (1050, M30PASS, produced by Tokyo Printing Ink Mfg. Co., Ltd.) was applied to the non-silicone-coated surface to form a staggered pattern in which 14 dots, each having a diameter of 6 mm and a thickness of 1 mm, were uniformly formed per square of 3.5 cm×3.5 cm. A heat treatment was then performed at 190° C. for 1 minute to immobilize the LDPE resin on the non-coated layer surface.

Table 1 shows the physical properties etc. of the obtained silicone-coated fabric. The obtained silicone-coated fabric had an adhesive strength of 0.08 N/cm and a compactness of 55 mm, and creases formed by applying heat and pressure were well maintained.

Example 2

An addition polymerization methyl vinyl silicone resin was applied once to the same woven fabric as in Example 1 by knife coating, and curing treatment was performed at 190° C. for 1 minute, thereby obtaining a silicone-coated fabric having a coating amount of 30 g/m$^2$. Thereafter, an EVA resin (2030, M30PASS, produced by Tokyo Printing Ink Mfg. Co., Ltd.) was applied to the non-coated surface to form a staggered pattern in which 14 dots, each having a diameter of 2 mm and a thickness of 1 mm, were uniformly formed per square of 3.5 cm×3.5 cm. A heat treatment was then performed at 190° C. for 1 minute to immobilize the EVA resin on the non-coated layer surface.

Table 1 shows the physical properties etc. of the obtained silicone-coated fabric. The obtained silicone-coated fabric had an adhesive strength of 1.5 N/cm and a compactness of 50 mm, and creases formed by applying heat and pressure were well maintained.

Example 3

An addition polymerization methyl vinyl silicone resin was applied once to the same woven fabric as in Example 1 by knife coating, and curing treatment was performed at 190° C. for 1 minute, thereby obtaining a silicone-coated fabric having a coating amount of 30 g/m$^2$. Thereafter, an EVA resin (2030, M30PASS, produced by Tokyo Printing Ink Mfg. Co., Ltd.) was applied to the non-coated surface to form a staggered pattern in which 14 dots, each having a diameter of 6 mm and a thickness of 1 mm, were uniformly formed per square of 3.5 cm×3.5 cm. A heat treatment was then performed at 190° C. for 1 minute to immobilize the EVA resin on the non-coated layer surface.

Table 1 shows the physical properties etc. of the obtained silicone-coated fabric. The obtained silicone-coated fabric had an adhesive strength of 3.5 N/cm and a compactness of 45 mm, and creases formed by applying heat and pressure were well maintained.

Example 4

An addition polymerization methyl vinyl silicone resin was applied once to the same woven fabric as in Example 1 by knife coating, and curing treatment was performed at 190° C. for 1 minute, thereby obtaining a silicone-coated fabric having a coating amount of 30 g/m$^2$. Thereafter, a polyamide resin (F915, type L, produced by Tokyo Printing Ink Mfg. Co., Ltd.) was applied to the non-coated surface to form a staggered pattern in which 14 dots, each having a diameter of 6 mm and a thickness of 1 mm, were uniformly formed per square of 3.5 cm×3.5 cm. A heat treatment was then performed at 190° C. for 1 minute to immobilize the polyamide resin on the non-coated layer surface.

Table 1 shows the physical properties etc. of the obtained silicone-coated fabric. The obtained silicone-coated fabric had an adhesive strength of 11.0 N/cm and a compactness of 45 mm, and creases formed by applying heat and pressure were well maintained.

Example 5

An addition polymerization methyl vinyl silicone resin was applied once to the same woven fabric as in Example 1 by knife coating, and curing treatment was performed at 190° C. for 1 minute, thereby obtaining a silicone-coated fabric having a coating amount of 30 g/m$^2$. Thereafter, a polyester resin (G170, type Z, produced by Tokyo Printing Ink Mfg. Co., Ltd.) was applied to the non-coated surface to form a staggered pattern in which 14 dots, each having a diameter of 6 mm and a thickness of 1 mm, were uniformly formed per square of 3.5 cm×3.5 cm. A heat treatment was then performed at 190° C. for 1 minute to immobilize the polyester resin on the non-coated layer surface.

Table 1 shows the physical properties etc. of the obtained silicone-coated fabric. The obtained silicone-coated fabric had an adhesive strength of 8.0 N/cm and a compactness of 45 mm, and creases formed by applying heat and pressure were well maintained.

Comparative Example 1

An addition polymerization methyl vinyl silicone resin was applied once to the same woven fabric as in Example 1 by knife coating, and curing treatment was performed at 190° C. for 1 minute, thereby obtaining a silicone-coated fabric having a coating amount of 30 g/m². Thereafter, a thermoplastic resin was not applied to the fabric.

Table 2 shows the physical properties etc. of the obtained silicone-coated fabric. The obtained silicone-coated fabric had a compactness of 72 mm, and creases formed by applying heat and pressure were not maintained.

Comparative Example 2

An addition polymerization methyl vinyl silicone resin was applied once to the same woven fabric as in Example 1 by knife coating, and curing treatment was performed at 190° C. for 1 minute, thereby obtaining a silicone-coated fabric having a coating amount of 30 g/m². Thereafter, an LDPE resin (1050, M30PASS, produced by Tokyo Printing Ink Mfg. Co., Ltd.) was applied to the coated surface to form a staggered pattern in which 14 dots, each having a diameter of 1 mm and a thickness of 0.5 mm, were uniformly formed per square of 3.5 cm×3.5 cm. A curing treatment was then performed at 190° C. for 1 minute to immobilize the LDPE resin on the coated layer surface.

Table 2 shows the physical properties etc. of the obtained silicone-coated fabric. The obtained silicone-coated fabric had an adhesive strength of 0.005 N/cm and a compactness of 72 mm, and creases were not maintained.

TABLE 1

|  | Ex. 1 | Ex. 2 | Ex. 3 | Ex. 4 | Ex. 5 |
|---|---|---|---|---|---|
| Thermoplastic resin | LDPE | EVA | EVA | Polyamide | Polyester |
| Thermoplastic resin adhering amount (g/m²) | 300 | 40 | 300 | 300 | 300 |
| Melting point of thermoplastic resin (° C.) | 105 | 97 | 97 | 90 | 115 |
| Thermoplastic resin adhesion pattern | Dia.: 6 mm, dot | Dia.: 2 mm, dot | Dia.: 6 mm, dot | Dia.: 6 mm, dot | Dia.: 6 mm, dot |
| Adhesive strength (N/cm) | 0.08 | 1.5 | 3.5 | 11.0 | 8.0 |
| Compactness (mm) | 55 | 50 | 45 | 45 | 45 |

TABLE 2

|  | Comp. Ex. 1 | Comp. Ex. 2 |
|---|---|---|
| Thermoplastic resin | — | LDPE |
| Thermoplastic resin adhering amount (g/m²) | — | 10 |
| Melting point of thermoplastic resin (° C.) | — | 105 |
| Thermoplastic resin adhesion pattern | — | Dia.: 1 mm, dot |
| Adhesive strength (N/cm) | — | 0.005 |
| Compactness (mm) | 72 | 72 |

INDUSTRIAL APPLICABILITY

This silicone-coated fabric is suitable for use in a storage method comprising folding an airbag more compactly by forming creases by simultaneously applying heat and pressure to the base fabric, and the use of the silicone-coated fabric enables production of an airbag in which creases can be easily formed by applying heat and pressure, and that can be stored compactly; therefore, restrictions on vehicle interior designs can be reduced, which is a great contribution to the industry.

DESCRIPTION OF REFERENCE NUMERALS

1: Thermoplastic Resin
2: Non-Silicone-coated Surface of Silicone-coated Fabric
3: Silicone-coated Surface of Silicone-coated Fabric
4: Valley Broken Line
5: Mountain Broken Line

The invention claimed is:

1. A silicone-coated fabric comprising:
a synthetic fiber woven fabric,
a silicone-containing resin coated on one surface of the synthetic fiber woven fabric, and
a thermoplastic resin adhering to a non-silicone coated surface of the synthetic fiber woven fabric, which is not coated with the silicone-containing resin, the synthetic fiber woven fabric being between the silicone-containing resin and the thermoplastic resin,
wherein the adhesive strength between the non-silicone coated surface and the thermoplastic resin is 0.01 to 100 N/cm and the thermoplastic resin has an adhering area of 1 to 45% on the non-silicone coated surface.

2. The silicone-coated fabric according to claim 1, wherein the thermoplastic resin has a melting point of 50 to 200° C.

3. The silicone-coated fabric according to claim 1, wherein the coating amount of the silicone-containing resin is 10 to 200 g/m².

4. An airbag obtained by using the silicone-coated fabric of claim 1.

5. The silicone-coated fabric according to claim 1, wherein the silicone-containing resin comprises an addition polymerization silicone rubber.

6. The silicone-coated fabric according to claim 5, wherein the silicone-containing resin comprises dimethyl silicone rubber, methyl vinyl silicone rubber, methylphenyl silicone rubber, trimethyl silicone rubber, fluorosilicone rubber, methyl silicone resin, methylphenyl silicone resin, methyl vinyl silicone resin, epoxy-modified silicone resin, acrylic-modified silicone resin, or polyester-modified silicone resin.

7. The silicone-coated fabric according to claim 1, wherein the silicone-containing resin further comprises an adhesive aid.

8. The silicone-coated fabric according to claim 7, wherein the adhesive aid is selected from the group consisting of amino-containing silane coupling agents, epoxy-modified silane coupling agents, vinyl-containing silane coupling agents, chloro-containing silane coupling agents, and mercapto-containing silane coupling agents.

9. The silicone-coated fabric according to claim 1, wherein the silicone-containing resin further comprises an inorganic filler.

10. The silicone-coated fabric according to claim 9, wherein the inorganic filler comprises silica particles.

11. The silicone-coated fabric according to claim 9, wherein the inorganic filler is in an amount of from 10 wt % to 20 wt % of the silicone-containing resin.

12. The silicone-coated fabric according to claim 9, wherein the silicone-containing resin has a resin viscosity of from 10,000 to 50,000 mPa·sec.

13. The silicone-coated fabric according to claim 1, wherein the thermoplastic resin comprises a low-density-polyethylene resin, an EVA resin, a polyamide resin, a polyester resin, a PVA resin, a polyurethane resin, a polyolefin resin, or an ionomer resin.

14. The silicone-coated fabric according to claim 1, wherein the coating amount of the thermoplastic resin is 20 to 400 g/m$^2$.

\* \* \* \* \*